United States Patent
Overcash et al.

(10) Patent No.: US 6,187,389 B1
(45) Date of Patent: Feb. 13, 2001

(54) AQUEOUS BASED IMAGE RECEPTIVE COATING AND PROCESS FOR PRODUCING SAME

(75) Inventors: Derric T. Overcash, Arlington, TX (US); Richard C. Wallace, Williamsport, PA (US)

(73) Assignee: **A*Ware Technologies, L.C.**, Dallas, TX (US)

( * ) Notice: Under 35 U.S.C. 154(b), the term of this patent shall be extended for 0 days.

(21) Appl. No.: 09/563,888

(22) Filed: May 3, 2000

Related U.S. Application Data

(60) Division of application No. 08/709,166, filed on Sep. 6, 1996, which is a continuation-in-part of application No. 08/369,135, filed on Jan. 5, 1995, now Pat. No. 5,981,011.

(51) Int. Cl.[7] .................................................... C08F 2/46
(52) U.S. Cl. ........................ 427/488; 427/261; 427/428; 427/430.1; 427/356; 427/359; 427/385.5; 427/407.1; 427/494; 427/496; 427/498; 427/500; 427/504; 427/508; 427/510; 427/511; 427/514; 427/521; 427/535; 427/551; 427/552; 427/553; 427/555; 427/558; 427/559; 427/595
(58) Field of Search .................... 427/428, 430.1, 427/356, 359, 385.5, 407.1, 496, 498, 500, 504, 508, 510, 511, 514, 521, 551, 552, 553, 555, 558, 559, 595, 261, 535

(56) References Cited

U.S. PATENT DOCUMENTS

| | | | |
|---|---|---|---|
| 3,300,364 | 1/1967 | Gottwald et al. | 145/281 |
| 3,580,876 | 5/1971 | Stone et al. | 260/29.4 |
| 4,418,119 | 11/1983 | Morrow et al. | 428/342 |
| 4,463,029 | 7/1984 | Nishijima et al. | 427/209 |
| 5,320,898 | 6/1994 | Yoshida et al. | 428/195 |
| 5,643,678 | 7/1997 | Boswell | 428/467 |

OTHER PUBLICATIONS

Letter and screen prints from "The Voyage Through Holography," Multimedia CD–ROM provided by Pennsylvania Pulp & Paper Co., Copyright 1996. (No Month Avail.)

Letter on HoloPRISM® diffraction and holographic metallized papers, Paper on "Metallized Papers: The Next Generation," by Randall D. Jacobs, Marketing Manager, Van Leer Metallized Products (USA) Ltd., Franklin, MA, letter dated Aug. 17, 1994.

PCT Search Report.

*Primary Examiner*—Bernard Pianalto
(74) *Attorney, Agent, or Firm*—Baker Botts L.L.P.

(57) ABSTRACT

This invention relates to an economical coating composition for porous substrates that provides extremely glossy surfaces, is capable of supporting holographic images, provides good oxygen barrier properties as well as good oil, grease, solvent and water resistance. Said coatings on paper substrates are printable, biodegradable, recyclable, and repulpable. They are also suitable for use in conjunction with food products. This invention also relates to a process for applying said coatings onto porous substrates as well as a process for the economical production of inexpensive holographic images on substrates such as paper and cardboard containers.

28 Claims, 1 Drawing Sheet

AQUEOUS BASED IMAGE RECEPTIVE COATING AND PROCESS FOR PRODUCING SAME

This application is a divisional of Application Ser. No. 08/709,166, filed Sep. 6,1996 entitled Aqueous Based Image Receptive Coating and Process for Producing Same, which is a continuation-in-part of Application Ser. No. 08/369,135, filed Jan. 5, 1995, U.S. Pat. No. 5,981,011, entitled Aqueous Based Image Receptive Coating and Process for Producing Same.

BACKGROUND OF THE INVENTION

1. Field of the Invention

This invention relates to an economical coating composition for porous substrates that provides extremely glossy surfaces, is capable of supporting holographic images, provides good oxygen barrier properties as well as good oil, grease, solvent and water resistance. Said coatings on paper substrates are printable, biodegradable, recyclable, and repulpable. They are also suitable for use in conjunction with food products. This invention also relates to a process for applying said coatings onto porous substrates as well as a process for the economical production of inexpensive holographic images on substrates such as paper and cardboard containers.

2. Prior Art

It has been desirable to produce holographic or 3-dimensional graphical images and high gloss paper and high gloss white paper substrates on packaging, marketing, and promotional materials more economically than by manufacturing processes that are currently available. These holographic or 3-dimensional graphical images provide multiple color (rainbow) like affects on the these packaging, promotional, and marketing materials. The high gloss paper and high gloss white paper affects enhance the surface appearance of an otherwise unattractive substrate. These affects appeal to consumers and enhance the products or promotional image. Economics of the current process has deterred many in the highly competitive markets not to include or utilize holographic affects in their marketing or promotional packages. High gloss paper and high gloss white paper substrates are also not economically attractive.

To achieve the holographic image or 3-dimensional graphical images, a holographic pattern or design is selected is then embossed onto the surface of a cylinder or plate. Laser etching has also been introduced into the market. The roller or plate then is used to emboss or impress the holographic image of the roller or plate onto a high gloss smooth surface such as polyester, polyvinyl chloride, polypropylene, polystyrene or polyethylene. Or the holographic image is impressed into a semi-soft or hard coating which was coated onto the polyester. This non aqueous based coating is typically 100% polyurethane. This embossed coating can be transferred with the holographic image or bonded permanently to the carrier depended upon which side of printing was preferred to enhance the holographic image. These embossed holographic image surfaces can be and are typically put through a Vacuum Metal Deposition process, where a certain amount of aluminum is vaporized and redeposited as a solid onto the embossed holographic surface. Highly reflective or dark inks are also utilized to reflect the light to achieve similar effects. This light reflection or mirror image behind the embossed holographic surface then gives a highly glossy attractive 3-dimensional graphical image or holographic image. The mirror surface behind the embossed surface reflects light that provides the holographic effect. This metallizing process is fast and cost effective. This embossed highly glossy smooth holographic 3-dimensional metallized surface is usually then laminated to various papers or itself and other materials and or formed into packages for the consumer to enhance product appeal. The cost of the polyolefins and transfer embossed urethanes as part of the process to deliver the finished holographic 3-dimensional process is very costly and environmentally detrimental. To achieve similar high gloss paper substrates with good barrier properties compared to the embodiments of this invention, typically paper mills and or paper converters laminate polymer films such as, but not limited to, polyester, polypropylene, or polyethylene to various paper substrates. Another process to achieve barrier properties and high gloss is to extrude polyethylene and/or polyethylene teraphthalate onto paper surfaces. Both the laminate materials and extrusion materials are not biodegradable, recyclable, or repulpable. The high costs of the extruded and laminated polymer films and the non-reclamation of the scrap materials make these products economically unattractive for the majority of packaging and promotional materials.

To achieve similar high gloss white paper substrates with good barrier properties compared to the embodiments of this invention, typically paper mills and or converters laminate polymer films such as, but not limited to polyester, polypropylene, or polyethylene to various white (bleached or clay\titanium dioxide coated) paper substrates. Another process to achieve barrier properties and high gloss is to extrude polyethylene and or polyethylene teraphthalate onto white (bleached or clay\titanium dioxide coated) paper substrates. Both the laminate materials and extrusion materials are not biodegradable, recyclable, or repulpable. The high costs of the conventionally fabricated films and non-reclamation of the scrap materials also makes these products also economically unattractive for the majority of standard packaging or promotional materials.

It is therefore desirable to produce a more cost effective way of manufacturing a high gloss, smooth, clear and more environmentally acceptable holographic 3-dimensional metallized products, high gloss papers, and high gloss white paper substrates suitable for use in consumer packaging. Furthermore, it is desirable to produce a holographic 3-dimensional metallized product, a high gloss paper, and a high gloss white paper substrate that can be biodegradable, recyclable and repulpable in current reclamation systems that exists today. The current holographic 3-dimensional metallized extruded and laminated polyolefins, polyesters and urethanes are not recyclable, repulpable, or biodegradable in their usual forms.

BRIEF DESCRIPTION OF THE DRAWINGS

The present invention is described more fully in the following detailed description of embodiments taken in conjunction with the drawings wherein.

DETAILED DESCRIPTION OF THE INVENTION

There has now been discovered a novel composition and process to create a coated sheet material, supporting holographic and 3-dimensional images, as well as producing high gloss and high gloss white substrates, embodiments of which are cost effective, extremely glossy, provide excellent holographic images, good oxygen barrier properties, very smooth printable surface, biodegradable, recyclable, repulpable, very good oil, grease, solvent and water resistance, suitable for use in conjunction with food products, and very good glueability with an appropriate adhesive. In its preferred form, the substrate material is comprised of a porous substrate material, and an image receptive holographic or non-holographic, smooth, non-porous, high gloss barrier coating layer comprising (i) a crosslinkable polymer resistant to penetration by water moisture, and (ii) a grease-resistant, water resistant, water dispersible, film forming polymer. Said coating formulation may optionally comprise a release layer. The image receptive barrier coating may also include fillers, clays, micas, pigments, dyes, waxes, fatty acids, slip agents, wetting agents., defoamers, and dispersing agents. Suitable substrate sheet materials are preferably porous, and therefore not impervious to water and oil, and may vary widely. These include substrates comprised of non-woven and woven polymers such as fabrics, porous clays such as clay baking containers, metal oxide aerogels, and cellulose-based materials, such as paper and cardboard substrates, and the like. One preferred embodiment of the present invention comprises a porous sheet material made of a cellulose material, or a cellulose-based material, such as paper or paper-like materials. Such paper sheet materials include, for example, corrugated paperboard (or "cardboard"), newsprint paper, uncorrugated Kraft paper stock, pan liner paper stock, and the like. In addition to paper and paper-like materials, other cellulose-based sheet materials, such as pressed board, may also be suitable. It is also possible to use other fibrous materials for the substrate sheet material. In significant part, the choice of substrate will depend on economic concerns—low cost substrates being preferred in this regard—and the intended use of the coated sheet material. For strength and stability, as well as low cost compared to other materials, an 18 point virgin hardwood Kraft liner board is one preferred but not limited to substrate.

Figure 1:
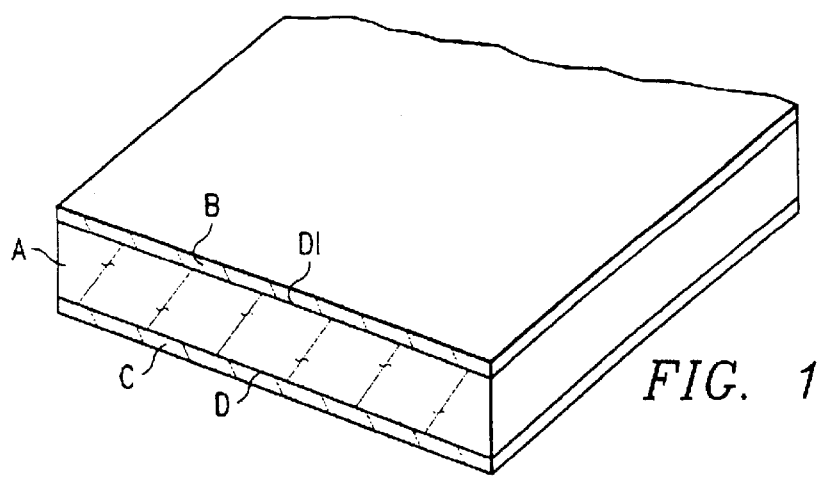
FIG. 1 represents a cross-sectional perspective view of a holographic embossed and non-holographic embossed carrier substrate with coated material embodying the present invention.

With reference to FIG. 1, in the preferred operation, a non-porous substrate carrier material A, having oppositely disposed surfaces D and D1, surface D having high gloss, smooth, non-porous and non-adherent, untreated or treated, non-embossed or non-holographic surface, surface D1 having high gloss, non-porous and non-adherent, treated or untreated, holographic embossed or etched image or pattern, first coated on surface D1 with a image receptive barrier coating composition B. The image receptive barrier coating composition B may be applied, as a solution or dispersion, by roll coater, Myar rod, engraved roll, gravure roller, air knife, brush, doctor blade or blade coater, sprayer, dip coating, or other such suitable application means; however, in the manufacturing context, it will presumably be preferable to use a gravure roller or Myar Rod application. Preferably, the viscosity of the coating composition B ranges from about 100 to 1000 cps (#4 Spindle), more preferably from about 250–750 cps (#4 Spindle), and most preferably about 300–400 cps (#4 Spindle). The image receptive barrier coating B is applied in sufficient amounts to achieve the performance levels desired by the end materials. Preferably, it is applied at a rate of about 0.4–12 lbs per 1000 square feet onto the non-porous carrier holographic image surface D1, more preferably at a rate about 2–8 lbs. per 1000 square feet of substrate, and most preferably at a rate of about 4–7 lbs per 1000 square feet. The coated non-porous support carrier A with the holographic embossed surface D1 with image receptive barrier coating B is then partially cured or fully cured.

Figure 2:
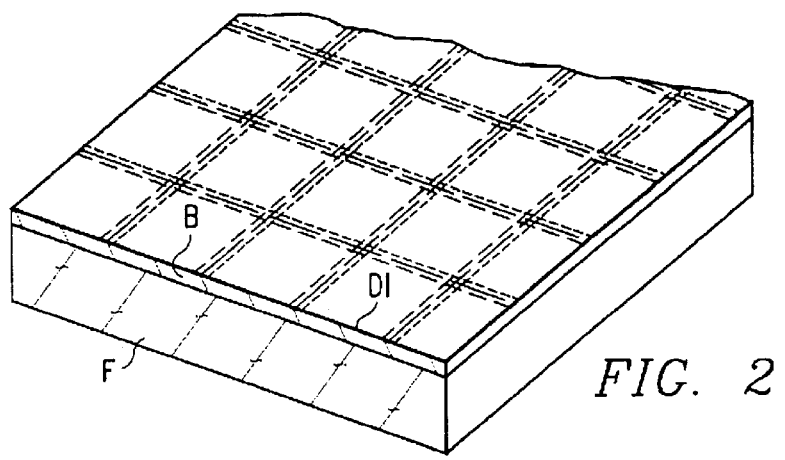
FIG. 2 represents a cross-sectional perspective view of a transfer coated holographic sheet material embodying the present invention in flat sheet form.

With reference to FIG. 2, the holographic embossed image carrier substrate sheet material A with image receptive barrier coating B after curing is then put through a transfer or lamination process. This transferring or lamination process transfers the barrier coating B with its cast image of the carrier surface from the non-porous, holographic embossed image carrier substrate A surface D1, to the substrate material F. The non-porous, holographic embossed image substrate sheet material A is removed, thus transferring the coating B, with a casting of the holographic embossed image of surface D 1, to substrate material F.

With reference to FIG. 1, in the preferred operation, the image receptive barrier coating C is deposited onto the high gloss, non-porous and non-adherent, untreated or treated, non-embossed or non-holographic surface D. The image receptive barrier coating composition C may be applied, as a solution or dispersion, by roll coater, Myar rod, engraved roll, gravure roll, air knife, brush, doctor blade or blade coater, sprayer dip coating, or other such suitable applications means; however, in the manufacturing context, it will presumably be preferable to use gravure roller or Myer rod application. Preferably, the viscosity of the coating composition C is from 100–1000 cps (#4 Spindle), more preferably about 300–800 cps (4# Spindle), and most preferably about 300–400 cps (#4 Spindle). Preferably, it is applied at a rate of about 0.3–13 lbs per 1000 square feet onto the non-porous, non-holographic, high gloss surface D, more preferably at a rate of about 3–9 lbs per 1000 square feet of non-porous support material, and most preferably at a rate of about 4–8 lbs per 1000 square feet. The substrate A with the non-holographic high gloss surface D with image receptive barrier coating composition C is then partially cured or fully cured.

Figure 3:
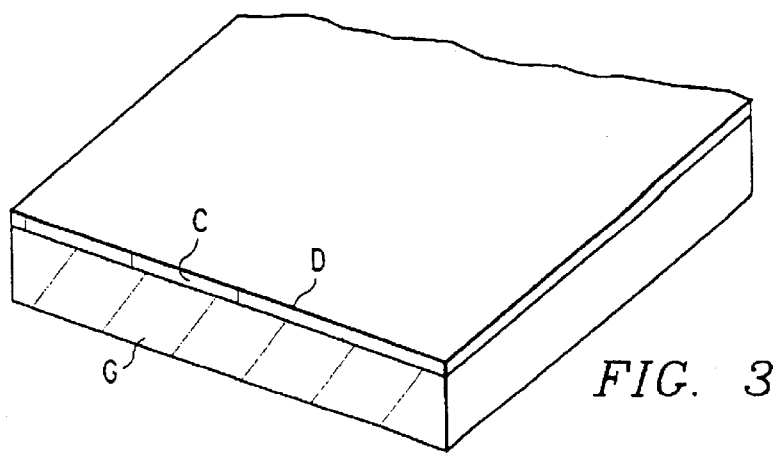
FIG. 3 represents a cross-sectional perspective view of a transfer coated high gloss sheet material embodying the present invention in flat sheet form.

In reference to FIG. 3, the preferred operation after partial curing or fully curing coating C, the non-holographic, high gloss carrier substrate sheet material A with image receptive barrier coating C is then put through a transfer or lamination process. This transferring or lamination process transfers the image receptive barrier coating C from the non-porous, smooth, high gloss, carrier substrate A surface D, to the porous substrate material G. The carrier substrate A is then removed, thus transferring the high gloss, smooth, non-holographic barrier coating C with the image of smooth surface D to the porous substrate material G. Suitable methods to effect the transfer process are known in the art and include hot pressing and the use of heated pressure rollers. Suitable carrier substrate materials include polyester films, polycarbonate films, polyurethane films, metal sheets and films, metal rollers and drums, and the like. It is preferred that substrates have rigid surfaces so as to maintain their shape on repeated use. The surfaces of these carrier substrates in the practice of this invention are critical. To obtain high gloss coatings, the surface of the carrier should be very smooth and uniform. On the other hand, when and image, such as a holographic image, is desired in the final coating, then the surface of the carrier must be embossed or etched with the pattern that is desired to be cast into the coating of the present invention.

Various embodiments of the image receptive barrier coating-transfer process within the scope of this invention are possible. Advantages of such a image receptive barrier coating-transfer process include: the ability to reuse the non-porous and non-adherent, smooth, treated or untreated, holographic embossed or etched, or non-holographic high gloss surface flexible support carrier multiple times (e.g. as a master copy) with limits only bounded by handling; the ability to replace conventional expensive image supporting extruded or laminated polymers such as but not limited to polyesters, polypropylene, and polyethylene, with aqueous based coatings that give the same aesthetics (including holographic images) and similar functionality but allow the coated material to be biodegradable, recyclable, and repulpable; the ability to significantly reduce the cost of the material and process; conservation of the material required to coat porous substrates versus casting coatings onto a non-porous more expensive substrate surface; the ability to print onto the smooth surface of the applied coating prior to the transfer or lamination process to produce a finer print than that which is available by printing onto the porous substrate before coating; the ability to incorporate an aesthetically attractive surface, such as that obtained by metallization, metal coating, dying, coloring, etc, onto the surface of a substrate which is otherwise substandard in aesthetic appearance; and the ability to transfer a high gloss or texture imprinted on the carrier to the porous substrate via the formed and transferred film coating.

Another aspect of this invention relates to the image receptive barrier coating composition of the present invention. The image receptive barrier coatings of the present invention comprise (i) a crosslinkable polymer resistant to moisture, and (ii) a grease resistant, water resistant, water dispersible, film forming polymer. The ratio of water-dispersible, film-forming polymer to crosslinkable polymer in the barrier coating composition by weight of the solids of each polymer, can vary widely, but is preferably between about 0.25:1 and about 1:1. Such compositions are preferably applied to a non-porous, holographic image embossed or etched, or high gloss flexible substrate carrier material as part of a solution or dispersion. Crosslinkable resins are preferred in order to resist penetration by water moisture into the substrate sheet material as well as to permanently retain the image of the carrier surface. One preferred class of crosslinkable resins includes dialdehyde resins. Preferred crosslinkable dialdehyde resins include Glyoxal™ 40 N, made by Hoechst Celanese. In addition, polyamine-epichlorohydrins (PAEs) have been found to function suitably as crosslinkable polymers in the image receptive barrier coating composition, including such PAEs as Polycup™ 172 LX, made by Hercules Corporation. Blends and/or copolymers of crosslinkable polymers may also be used. Other crosslinkable polymers, such as polyvinyl alcohols, carboxylated polyvinyl acetates, polyurethane polymers, acrylic resins, styrene-butadiene resins, ammonium zirconium carbonate containing resins, chrome complexes and various fluorochemical polymers, may also provide the necessary barrier properties. The crosslinkable polymer preferably has a molecular weight, before curing, of greater than about 5,000. After curing, when the crosslinkable polymer is cross-linked (i.e., when monomer or co-monomer repeat units in adjacent polymer chains are chemically linked), the molecular weight of the polymer may be about 20,000 to 40,000 or greater. The crosslinkable polymer, after curing, preferably crosslinks to an extent so as to retain its shape and provide the desired water moisture barrier properties, but not to the extent the material cannot be recycled, rendered biodegradeable, or repulpable. Preferably, the degree of the crosslinking is between about 0.25% and about 15%, and more preferably between about 0.5% and about 5%, as expressed by the average weight percentage of monomer or co-monomer repeat units in the polymer that are crosslinked. Exemplary polymers useful as crosslinkable polymers resistant to water moisture in the image receptive barrier coating composition include but are not limited to:

polymers and copolymers of poly(dienes) such as poly (butadiene), poly(isoprene), and poly(1-pentenylene);

polyacrylics and polyacrylic acids such as poly(benzyl acrylate), poly (butylacrylate) (s), poly(2-cyanobutyl acrylate), poly(2-ethoxyethyl acrylate), poly (ethylacrylate), poly(2-ethylhexyl acrylate), poly (fluoromethyl acrylate), poly(5,5,6,6,7,7,7-heptafluoro-3-oxaheptyl acrylate), poly(heptyl acrylate), poly(hexyl acrylate), poly(isobornyl acrylate), poly(isopropyl acrylate), poly(3-methoxybutyl acrylate), poly(methyl acrylate), poly (nonyl acrylate), poly(octyl acrylate), poly(propyl acrylate), poly(p-toyl acrylate), poly(acrylic acid) and derivatives and salts thereof;

polyacrylamides such as poly(acrylamide), poly(N-butylacrylamide), poly(N-dibutylacrylamide), poly(N-dodecylacrylamide), poly(morpholyacrylamide);

polymethacrylic acids and poly(methacrylic acid esters) such as poly(benzyl methacrylate), poly(octyl methacrylate), poly(butyl methacrylate), poly(2-chloroethyl methacrylate), poly(2-cyanoethyl methacrylate), polydodecyl methacrylate), poly(2-ethylhexyl methacrylate), poly(ethyl methacrylate), poly(1,1,1-trifluoro-2-propylmethacrylate), poly(hexyl methacrylate), poly(2-hydroxyethyl methacrylate), poly(2-hydroxypropyl methacrylate), poly(isopropyl methacrylate), poly(methacrylic acid), poly(propyl methacrylate), and poly(methyl methacrylate) in various forms such as, atactic, isotactic, syndiotactic, and heterotactic;

polymethacrylamides such as poly(4-carboxyphenylmethacrylamide); other alpha- and beta-substituted poly(acrylics) and poly(methacrylics) such as poly(butyl chloracrylate), poly(ethyl ethoxycarbonylmethacrylate), poly(methyl fluoroacrylate), and poly(methyl phenylacrylate), and poly(methyl phenylacrylate);

polyvinylethers such as poly(butoxyethylene), poly (ethoxyethylene), poly(ethylthioethylene), poly (dodecaflurobutoxyethylene), poly(2,2,2-trifluoroethoxytrifluoroethylene), poly (hexyloxyethylene), poly(methoxyethylene), and poly (2-methoxypropylene);

polyvinyl halides and poly(vinyl nitriles) such as poly (acrylonitrile), poly(1,1-dichloroethylene), poly (chloritrifluoroethylene), poly(1,1-dichloro-2-fluoroethylene), poly(1,1-difluororethylene), poly (methacrylonitrile), poly(vinyl chloride), and poly (vinylidene chloride);.

polyvinyl esters such as poly(vinyl acetate), poly (benzoyloxyethylene), poly(4-butyryl-oxybenzoyloxyethylene), poly(4-ethylbenzoyloxyethylene), poly[(trifluoroacetoxy)-ethylene], poly[(heptafluorobutyryloxy)ethylene], poly (formyloxyethylene), poly[(2-methoxy-benzoyloxy) ethylene], poly(pivaloyloxyethylene), and poly(propionlyoxyethylene); and hydrolyzed or partially hydrolyzed versions therof, such as poly(hydroxyethylene-co-acetoxyethylene), poly(hydroxyethylene-co-formyloxyethylene), poly(vinyl alcohol), and the like;

other vinyl polymers, such as poly(vinylpyrrolidone) and the like;

hydroxyl containing polymers, such as poly(butylene alcohol), poly(propylene alcohol), poly(vinyl alcohol), poly(hydroxyethyl acrylate), poly(hydroxyethyl methacrylate), and the like;

polystyrenes such as, poly(4-acetylstyrene), poly[3-(4-biphenylyl)styrene], poly(4-[2-butoxyethoxy)methyl] styrene), poly(4-butoxymethylstyrene), poly(4-butoxystyrene), poly(4-butylstyrene), poly(4-chloro-2-methylstyrene), poly(2-chlorostyrene), poly(2,4-dichlorostyrene), poly(2-ethoxymethylstyrene), poly(4-ethoxystyrene), poly(3-ethylstyrene), poly(4-fluorostyrene), poly(perfluorostyrene), poly(4-hexylstyrene), poly[4-(2-hydroxyethoxymethyl) styrene], poly[4-(1-hydroxy-1-methylpropyl)styrene], poly(2-methoxymethylstyrene), poly(2-methoxystyrene), poly(alpha-methylstyrene), poly(2-methylstyrene), poly(4-methoxystyrene), poly(4-octanoylstyrene), poly(4-phenoxystyrene), poly(4-phenylstyrene), poly(4-propoxystyrene), and poly(styrene);

polyoxides and polyethers such as poly(ethylene oxides), poly(tetrahydrofuran, poly(oxetanes), poly(oxybutadiene), poly[(oxychloromethyl)ethylene], poly(oxy- 2-hydroxytrimethyleneoxy-1,4-phenylenemethylene-1,4-phenylene), poly(oxy-2,6-dimethoxy-1,4-phenylene) and poly(oxy-1,3-phenylene);

polycarbonates such as polycarbonate of Bisphenol A, and poly[(oxycarbonyloxy-4,6-dimethyl]-1,2-phenylenemethylene-3,5-dimethyl-1,2-phenylene);

polyesters such as poly(ethylene terephthalate), poly[1,2-diethoxycarbonyl)ethylene], poly[(1,2-dimethoxycarbonyl)ethylene], poly(oxy-2-butenyleneoxysebacoyl), poly[di-(oxyethylene) oxyadipoyl], poly(oxyethyleneoxycarbonyl-1,4-cyclohexylenecarbonyl), poly(oxyethyleneoxyisophthaloyl), poly[di(oxyethylene) oxyoxalyl], poly[di(oxyethylene)-oxysuccinyl], poly(oxyethyleneoxyethyleneoxyterephthaloyl), poly(oxy-1,4-phenyleneisopropylidene-1,4-phenyleneoxysebacoyl), and poly(oxy-1,3-phenyleneoxyisophthaloyl);

polyanhydrides such as poly(oxycarbonyl-1,4-phenylenemethylene-1,4-phenylene-carbonyl), poly(oxyisophthaloyl), poly(maleic anhydride), copolymers and hydrolyzed versions thereof;

polyurethanes such as poly(oxcarbonyliminohexamethylene-iminocarbonyloxydecamethylene), poly(oxyethyleneoxycarbonyliminio-hexamethyleneiminocarbonyl), poly(oxyethyleneoxycarbonylimino-1,4-phenylenetrimethylene-1,4-phenyleneiminocarbonyl), and poly(oxytetramethylene-oxycarbonylimino-1,4-phenylenemethylene-1,4-phenyleneiminocarbonyl);

polysiloxanes such as, poly(dimethylsiloxane), poly[oxymethylphenylsilylene], and poly(oxydiphenylsilylene-1,3-phenylene);

polysulfones and poly(sulfonamides) such as poly[oxycarbonyl di(oxy-1,4-phenylene) sulfonyl-1,4-phenyleneoxy-1,4-phenylene], poly(oxy-1,4-phenylenesulfinyl-1,4-phenyleneoxy-1,4-phenylenecarbonyl-1,4-phenylene), poly(oxy-1,4 phenylenesulfinyl-14 -phenylene), and poly(sulfonyl-1,3-cyclohexylene);

polyamides such as nylon-6, nylon-6,6, nylon-3, nylon-4,6, nylon-5,6, nylon-6,2, nylon-6,12, nylon-12, and poly(vinyl pyrrolidone);

polyimines such as poly(acetyliminoethylene), polyethylenimine and poly(valeryliminoethylene);

polybenzimidazoles such as poly(2,6-benzimidazolediyl-6,2-benzimidazolediyl octamethylene);

carbohydrates such as starches, amylose triacetate, cellulose triacetate, cellulose tridecanoate, ethyl cellulose, methycellulose, carboxymethylcellulose, hydroxyethylcellulose, and the like;

and polymer mixtures and copolymers thereof such as poly(acrylonitrile-co-styrene), with poly(e-caprolactone), or poly(ethyl methacrylate), or poly(methylmethacrylate); poly(acrylonitrile-co-vinylidene chloride) with poly(hexamethyleneterephthalate); poly(allyl alcohol-co-styrene) with poly(butylene adipate), or poly(butylene sebacate); poly(n-amyl methacrylate) with poly(vinyl chloride); bisphenol A polycarbonate with poly(e-caprolactone), or poly(ethylene adipate), or poly(ethylene trerephthalate), or novolac resin; poly(butadiene) with poly(isoprene); poly(butadiene-co-styrene) with glycerol ester of hydrogenated rosin; poly(butyl acrylate) with poly(chlorinated ethylene), or poly(vinyl chloride); poly(butyl acrylate-co-methyl methacrylate) with poly(vinyl chloride); poly(butyl methacrylate) with poly(vinyl chlroide); poly(butylene terephthalate) with poly(ethylene terephthalate), or poly(vinyl acetate-co-vinylidene chloride); poly(e-caprolactone) with poly(chlorostryrene), or poly(vinyl acetate-co-vinylidene chloride); cellulose acetate with poly(vinylidene chloride-co-styrene); cellulose acetate-butyrate with poly(ethylene-co-vinyl acetate); poly(chlorinated ethylene) with poly(methyl methacrylate); poly(chlorinated vinyl chloride) with poly(n-butyl methacrylate), or poly(ethyl methacrylate), or poly(valerolactone); poly(chloroprene) with poly(ethylene-co-methylacrylate); poly(2,6-dimethyl-1,4-phenylene oxide) with poly(a-methylstyrene-co-styrene), or poly(styrene); poly(ethyl acrylate) with poly(vinyl chloride-co-vinylidene chloride), or poly(vinyl chloride); poly(ethyl methacrylate) with poly(vinyl chloride); poly(ethylene oxide) with poly(methyl methacrylate); poly(styrene) with poly(vinyl methyl ether); and poly(valerolactone) with poly(vinyl acetate-co-vinylidene chloride);

maleic anhydride copolymers, such as poly(maleic anhydride-co-ethylene), poly(maleic anhydride styrene), and the like.

In combination with the cross-crosslinkable polymer resistant to penetration by water moisture, it could be beneficial to enhance and expedite cross-linking by any suitable means, such as by heat, visible light radiation or UV, or by the use of gamma rays, x-rays, or electron beams, or by the use of high energy radiation, or exposure to air, or by corona discharge, or by addition of a chemical cross-linking agent. Heating the barrier coating composition after application onto the flexible carrier substrate will generally speed up the crosslinking process. Also useful as crosslinking agents are compositions containing high valent metal ions, such as iron(+3), titanium (+4), chromium(+3), and the like. Thus, Quilon™ (Dupont) formulations containing chromium (+3) complexes of fatty acids are suitable crosslinking agents. It can be appreciated by those skilled in the art that the choice of suitable crosslinking agent or method will depend on the nature of the crosslinkable polymer chosen for a particular application.

Another aspect of this invention relates to the water-dispersible, film-forming polymer in the image receptive barrier coating composition: The term "water-dispersible," as used herein is intended to include water-soluble compounds, as well as compounds that may be dispersed in, borne by, or carried in an aqueous mixture (i.e. "waterborne") even though the compound is not actually soluble in water. The water dispersible, film-forming polymer is generally applied to the non-porous, holographic image embossed, or high gloss flexible carrier substrate material as part of a solution or dispersion including the crosslinkable polymer resistant to water moisture, although the two polymers need not be applied as part of a single solution or dispersion formulation. Preferred for use in the practice of the present invention are water dispersible polymers comprised of hydroxylated polymers, such as polviriyl alcohols (PVAs). In certain cases, hydroxylated polymers can be used both as the crosslinkable polymer and the water-dispersible film-forming polymer. Thus, poly(vinyl alcohol) with 0.5% to 15% by weight of a chemical crosslinking agent can be used to form a image receptive barrier coating composition. The PVA crosslinked with the crosslinking agents of this invention provides improved barrier properties and increased resistance to solvents, greases, oils, waters, oxygen, tensile stresses etc. compared to uncrosslinked PVA. Other suitable water-dispersible, film-forming polymers include poly(butylene alcohol), poly(propylene alcohol), poly(vinyl acetate), poly(hydroxyethyl acrylate), hydroxethylcellulose, carboxymethylcellulose, poly(vinyl pyrrolidone), poly(styrene-co-butadiene) latex, and copolymers of any foregoing, and other like water-dispersible polymers. Pigments may be added to the image receptive barrier coating composition to enhance the surface appearance of the coated sheet material. For example, it may be desired that the surface of the transfer coated sheet material be a white high gloss color. If low cost brown Kraft paper is used as the substrate sheet material, then titanium dioxide pigment, Ti-Pure™ R-900 made by Dupont, or calcium carbonate made by Specialty Minerals Inc. can be added to the image receptive barrier coating. The amount of pigment will depended upon whiteness and brightness desired. To obtain optimum brightness, whiteness, and high gloss and minimize pigment usage, metallizing or vacuum depositing metal onto the pigmented image receptive barrier coating while on the flexible carrier substrate with an amount of metal to obtain optimum light reflectancy is preferred. Another example of pigment addition, is to print or coat the image receptive barrier coating with white or other pigment colors on the image receptive barrier coating composition either before or after the transfer process is completed to the porous substrate to achieve brightness, whiteness, opacity, or other colors deemed desirable. In one preferred process of the present invention, printing or coating of the white pigment or other colors is done while the high gloss smooth image receptive barrier coating is still on the flexible carrier substrate prior to the transfer process. In addition, opacity, whiteness, and brightness can be obtained by adding pigment (titanium dioxide and or calcium carbonate) to a bonding agent (adhesive) if utilized in the transfer process.

By printing the pigments onto the smooth, high gloss, non-porous surface, prior to, or after the transfer process, ink usage will be reduced, dot definition will be increased, image reception increased and high gloss levels obtained onto low grades of very porous substrates such as Kraft papers that otherwise would not be achievable. In addition, a dispersing agent may be added to the image receptive barrier coating composition to help disperse and suspend the filler and pigment particles in the coating before deposition onto the flexible carrier substrate. There a large variety of dispersing agents that may be used. For example,. TSPP or tetrasodium pyrophosphate has been found to be effective. Sodium hexametaphosphate is suitable as well for this use.

Dyes may be added, such as food dyes, to give desired colors or appearance to the image receptive barrier coated substrate material. These dyes may enhance the holographic or non-holographic image receptive barrier coating and achieve special effects or the addition of new colors to the spectrum of holographic images.

Compared with prior attempts, the present invention represents a very unique approach to designing holographic, high gloss and high gloss coated porous sheet materials, and shaped articles there from, having various desirable properties and being simple and economical in design and construction.

Embodiments of the present invention achieve excellent holographic affects while maintaining recylcability, repulpability, and biodegradability. In addition, the present invention has developed new ways of taking low grades of Kraft paper and converting them to high gloss, smooth, sealed grease water and oil resistant, printable surfaces while maintaining excellent recycling and biodegrading qualities. Furthermore, embodiments of the present invention also achieve outstanding whiteness, brightness, high gloss, printability, recyclability, repulpability, and biodegradability on porous substrates. Further image enhancements can be obtained by metallizing which reduces the amount of expensive titanium dioxide pigment needed in white coatings. It has also been demonstrated that expensive titanium dioxide in the coatings of the present invention can be replaced with the less expensive calcium carbonate. The following examples are offered illustratively:

EXAMPLE 1

This example demonstrates that PVA and a crosslinking agent (Glyoxal™) can be used as the image receptive barrier coating for holographic coated substrates. It also demonstrates the ability to use the lowest grades of porous paper and turn them into highly glossy, multi-functional, non-porous, holographic image supporting substrates. An aqueous based image receptive barrier coating formulation comprised of:

50.0 g Airvol™ 165 Superhydrolyzed polyvinyl alcohol at (7% Solids), and 0.4375 g Glyoxal™ 40 N Dialdehyde (25% Solids)

was blended and then deposited onto a 2 mil holographic image embossed polyester film carrier substrate using a #17 Myar rod. The coating was applied at a rate of 6 lbs per 1000 sq feet and the image receptive barrier coating composition showed good wet out with no exhibition of fish eyes or voids in the coating. As the coating was deposited onto the holographic image embossed surface the image or pattern disappeared. The coating was cured by placing the coated holographic image embossed flexible carrier substrate into an oven for 30 seconds at 240° F. The crosslinked coating dried evenly. This image receptive crosslinked barrier coating was then tested for water resistance while on the flexible polyester carrier substrate by depositing a drop of water onto the surface of the coating and the water was observed through a magnifying lens. After 10 seconds the water did not penetrate or swell the coating; after 30 second the water did not penetrate or swell, after 1 minute the water did not penetrate or swell the coating; thus demonstrating that this cured crosslinked PVA film exhibited good water resistance. This image receptive PVA crosslinked barrier coating with flexible holographic image embossed carrier substrate was sent through a metallizing process whereby an opaque evaporated aluminum layer was deposited on top of the barrier coating.

Image Receptive Barrier Coating Transfer Process

The image receptive PVA coated 2 mil holographic image embossed polyester flexible carrier substrate with metal deposited onto the coating was then coated on top of the metal layer with a vinyl acetate ethylene copolymer based tie layer (adhesive) made by Air Products (#426) using a #6 Myar rod. A sheet of Kraft paper (69# stock, International Paper) was placed on top of the wet adhesive layer, and the composite structure was then run through heated rollers (350° F.) with high pressure. The flexible holographic embossed carrier polyester film substrate should come in contact with the heated roller to release the holographic image receptive PVA crosslinked barrier coating from the flexible holographic embossed carrier substrate. This heated lamination process contributes to setting the adhesive and forming a strong bond between the metal layer and paper. When the bond between the paper and the holographic image receptive barrier coating is greater than the bond between the coating and the flexible carrier substrate, the holographic image receptive barrier coating with the cast image of the holographic embossed surface will easily release from the carrier substrate and be transferred to the paper substrate.

EXAMPLE 2

This example demonstrates that polyvinyl alcohol can be used as image receptive barrier coating for producing high gloss coated substrates. This also demonstrates the ability to use the lowest grades of porous paper and turn them into high gloss, multi-functional, non-porous, smooth, printable, recyclable, biodegradable, and repulpable items suitable for packaging. A water based solution of Duponts' Elvanol™ HV super hydrolyzed polyvinyl alcohol (PVA) containing 7% solids was deposited onto a smooth untreated 2 mil polyester film to completely coat the surface. A #24 rod was then pulled across the coating to leave a uniform coating to the image receptive barrier coating solution on the polyester film substrate; the approximate coating rate was 7 lbs per 1000 sq ft. The coating was uniform and even as evidenced by the lack of any "fish-eyes" (voids) in the coating. The coating was then fully cured at 300° F. for 45 seconds in an oven.

Image Receptive Barrier Coating Transfer Process

The image receptive PVA coated 2 mil polyester film was then coated on top of the image receptive PVA with a vinyl acetate copolymer (adhesive) made by National Starch And Chemical using a #7 Myar Rod. A sheet of 18 pt. white cardboard, clay coated on one side, Kraft on the other side (Mead Beverage Board Stock) was placed on top of the wet adhesive layer (white side), and the composite structure was then run through heated rollers (350° F.) with high pressure. This heated lamination process contributes to 2 main areas of the process. One area, is that it contributes to the setting speed, wet and dry tack of the adhesive. Once the adhesives' bond between the coating and paper substrate is stronger than the bond to the flexible high gloss carrier polyester, the coating will easily release from the carrier surface and be transferred to the paper substrate. The second area, is that it contributes to the chemical bonding of the adhesive to the image receptive barrier coating through the addition of the crosslinker to the adhesive by heating or accelerating curing of the adhesive. This coalescent bonding occurs through —OH sites available from the image receptive PVA coating to the crosslinker added to the water based polyvinyl alcohol vinyl acetate ethylene copolymer based adhesive. This coalescent bonding increases the water resistance, wet rub, oil resistance, and adhesion to the paper substrate. Due to the clay coated surface being extremely absorbent and wet, it was found that waiting 3–5 minutes after wet lamination allowed the adhesive to set and the flexible carrier was easily removed from the composite structure. This image receptive barrier coated high gloss white substrate was subjected to a water resistance test, a wet rub test, oil resistant test, a gloss test, tensile test, wet Mullen psi test, and Elemdorf tear test as described below.

Water Resistance Test

A water drop was put onto the surface of the high gloss image receptive PVA barrier coated (transferred)white substrate and was observed through a magnifying lens. After 10 seconds, minor swelling of the PVA coating occurred; after 30 seconds, their was major swelling of the coating but no penetration past the image receptive barrier coating, thereby demonstrating good water resistance. It was observed that after the water droplet was removed from the surface, that the surface retained a shadow or dulling of the gloss appearance of where the droplet was due to the swelling of the image receptive barrier coating, but the same shadowing or dulling area disappears in time at ambient room temperatures or through heated air with complete return of the high gloss area.

Wet Rub Test

A water drop was placed onto the surface of the high gloss image receptive PVA barrier coated (transferred) substrate and allowed to sit for 1 minute at room temperature. A finger was placed on top of the water droplet and pressed down until contact with the PVA coating was made. The finger was then rubbed in circular motion with mild pressure in the area where the water drop was sitting on the coating. In 10 seconds, the image receptive PVA coating did not break down demonstrating that the image receptive barrier coating was mechanically and chemically bonded by the adhesive to the paper, exhibiting good water resistance.

Oil Resistance Test

Vegetable oil was poured onto the surface of the high gloss image receptive PVA barrier coated substrate and observed through a magnifying lens. After 3 minutes at room temperature the oil did not penetrate or swell the coating demonstrating that this coating exhibited very good oil resistance.

High Gloss, Tensile Strength, Wet Mullen-psi, and Elmendorf Tear Tests

The results of the above tests are set forth in Table 1.

TABLE 1

| Samples* | Caliper (mils) | Gloss 20° | Gloss 60° | Tensile (lbs. 0.5' width) MD | Tensile (lbs. 0.5' width) CD | Tensile (lbs. 0.5' width) CD (wet) | Wet Mullen-psi | Elmendorf Tear MD (g) | Elmendorf Tear CD |
|---|---|---|---|---|---|---|---|---|---|
| Kraft uncoated | 17.2 | 2.3 | 9.1 | 69 | 37 | 8.7 | 40 | 570 | 738 |
| Kraft white coated and Varnished | 18.9 | 3.7 | 24.3 | 76 | 35 | 11.1 | 40 | 746 | 809 |
| Kraft white coated with Present Coating | 19.0 | 58.3 | 92.4 | 79 | 35 | 11.2 | 40 | 745 | 809 |

*18 pt. Mead beverage board

These results show that the high gloss image receptive barrier coating of the present invention provided gloss levels unobtainable by standard processes that paper mills, and or converters utilize in majority of today's packaging and promotional papers including varnish coatings. In addition, the high gloss image receptive barrier coating provides exceptional improvements over standard white coated board in areas as indicated in Tensile MD Test and Elmendorf MD and CD Tests.

EXAMPLE 3

This example demonstrates the use of a simplified image receptive crosslinked barrier coating pigmented formulation, metallization and crosslinked barrier coating transfer process to produce high gloss white coated paper material with very good barrier properties.

An image receptive barrier coating solution was prepared containing:

40.0 g Airvol™ 165 super hydrolyzed PVA (6.5% Solids) (water dispersible polymer)

1.04 g Polycup™ 172 Polyamines (12.5% solids in water) (crosslinkable polymer)

2.05 g titanium dioxide (71% Solids in water) (pigment)

This coating solution was deposited onto a high gloss flexible smooth untreated polyester carrier film using a #20 Myar Rod. This applied the coating at a rate of 7 lbs per 1000 square feet. A smooth opaque looking coating was observed with no "fish-eyes" evident. The coating was fully cured and crosslinked by placing the flexible carrier film with coating into an oven for 30 seconds at 270° F. The coating dried evenly with a slightly opaque white transparent look. This white crosslinked barrier coating on the flexible high gloss polyester carrier substrate was then metallized (evaporated aluminum) to provide an opaque coating. The metal layer exhibited good adhesion to the image receptive white crosslinked barrier coating layer.

Coating Transfer Process

The image receptive white crosslinked barrier coating with metal was then coated with (on top of the metal) a vinyl acetate ethylene copolymer based tie layer (adhesive) made by Air Products (#426) using #7 Myar Rod. A sheet of Kraft paper (18 pt. Mead uncoated Kraft beverage board) was placed on top of the wet adhesive layer, and the composite structure was then run through heated rollers (325° F.) with high pressure. The flexible carrier polyester film side should come in contact with the heated roller to assist (through co-expansion and contraction of two different polymer materials) with releasing the metallized image receptive white crosslinked barrier coating from the flexible carrier polyester film substrate to the paper substrate. This heated lamination process contributes to setting the adhesive and forming a strong bond between the metal layer and the paper. When the bond between the paper and metal is greater than the bond between coating and flexible polyester film carrier, the metallized image receptive white crosslinked barrier coating will easily release from the carrier and be transferred to the paper substrate. This process provides a high gloss, very white, printable, smooth, non-porous, cost effective, water resistant, grease oil and solvent resistant, biodegradable, recyclable, and repulpable coated paper substrate from a low cost unattractive grade of Kraft paper.

EXAMPLE 4

This example demonstrates that polyvinyl alcohol can be used as both the crosslinkable polymer resistant to penetration by water moisture when fully cured, and the water-dispersible film-forming polymer that is resistant to penetration by grease and oil when fully cured. It also demonstrates the ability to use PVA as the high gloss white image receptive barrier coating, printable and or coatable with pigments, capable of being metallized, and suitable for use in a transfer coat process.

A water solution of Airvol™ 165 super hydrolyzed polyvinyl alcohol containing 7% solids was deposited onto a high gloss flexible polyester film carrier with complete surface coverage. A #24 Myar Rod was then pulled across the coating to leave a uniform coating of the image receptive barrier coating on the untreated flexible polyester film carrier; the approximate coating rate was 7 lbs per 1000 square feet. The wet image receptive barrier coating was uniform and no "fish-eyes" were observed. The coated polyester composite was then fully cured in an oven at 350° F. for 1 minute to effect drying and air crosslinking. This cured coating was subjected to a water resistance test and an oil test.

Water Resistance Test

A water drop was put onto the surface of the cured barrier coating while still on the flexible polyester film carrier substrate and was observed through a magnifying lens. After 5 seconds, the coating had swelled but the drop had not penetrated past the coating; after 15 seconds, the coating had increased in swelling but the droplet had not broken the coating continuity exhibiting enough water resistance to allow the image receptive barrier coating to be printed or coated with an aqueous based pigmented system to achieve a desired printed pattern or color.

Oil Resistance Test

Vegetable oil was poured onto the surface of the cured barrier coating while still on the flexible polyester film carrier substrate and observed through a magnifying lens. After 1 minute at room temperature, the oil did not penetrate or swell the coating demonstrating that this coating exhibited very good oil resistance.

Pigmenting and Metallization Process

The pigmented coating composition of the following formulation was prepared by blending the following ingredients:

25 g Polyco™ 2149—Carboxylated Vinyl Acetate Emulsion (water dispersible polymer)(47.5% Solids)

60 g Albagloss™ S—Precipitated Calcium Carbonate (pigment)(71% Solids)

2 g Polycup™ 172 LX—Polyamine Epichlorohydrin (crosslinkable polymer)

This coating was deposited onto the image receptive clear barrier coating surface described above with a #5 Myar Rod while the coating was still on the flexible polyester film carrier. The pigmented crosslinked coating was applied at the rate of 3 lbs per 1000 square feet and was then fully cured by putting the multilayer composite material into an oven for 30 seconds at 250° F. This heating process contributed to 2 main functions. Primarily, the heat is used to accelerate the evaporation process of the aqueous based system carrying the pigments, and secondly the heating process causes the acceleration of the crosslinking process of the crosslinker added to the pigmented coating, to the crosslinkable sites available in the pigmented coating and the sites available on the image receptive PVA barrier coating. The white pigmented coating exhibited good adhesion to the image receptive barrier coating. This white coated substrate was then metallized (evaporated aluminum) to thickness providing a 4% light transmission on top of the white pigmented coating. The metal layer exhibited good adhesion to the coated substrate.

Image Receptive Barrier Coat Transfer Process

The image receptive PVA barrier coating with a pigment cured coating and aluminum metal and polyester carrier was then coated with (on top of the metal) a vinyl acetate ethylene copolymer tie layer (adhesive) made by Air Products (#426) using a #7 Myar Rod. A sheet of Kraft Paper (18 pt 69# Mead Paper) was placed on top of the wet adhesive layer, and the composite structure was then run through heated rollers (350° F.) with high pressure. The flexible carrier should come in contact with the heated roller to assist with releasing the high gloss image receptive metallized barrier coating from the flexible polyester film carrier to the paper substrate. This heated lamination process contributes to the setting the adhesive and forming a strong bond between the metal layer and the paper. When the bond between the paper and metal is greater than the bond between the coating and flexible polyester film carrier, the high gloss image receptive metallized barrier coating will easily release from the polyester carrier and be transferred to the paper substrate. This process produces a high gloss, very white, printable, smooth, non-porous substrate that is cost effective, water, oil, grease and solvent resistant, and environmentally friendly, from a low grade Kraft porous substrate. The following table provides results of Tappi whiteness/brightness, opacity, and gloss level tests of the embodiments of this invention compared to typical papers currently available:

TABLE 2

| Sample* | Caliper | Gloss 20° | Gloss 60° | Brightness/ Whiteness | Opacity |
|---|---|---|---|---|---|
| Conventional Kraft | 16.6 | — | — | | |
| Conventional Kraft white coated | 17.2 | 2.3 | 9.1 | 79.0 | 100 |
| Conventional Kraft varnished white side | 18.9 | 3.7 | 24.3 | 77.7 | 100 |
| Conventional Kraft white coated with coating of present invention | 19.0 | 58.3 | 92.4 | 77.5 | 100 |
| Conventional Kraft coated on Kraft side with metallized/TiO$_2$ pigmented coating of present invention | 19.0 | 58.3 | 92.4 | 85.2 | 99.8 |
| Conventional Kraft coated on Kraft side with high gloss calcium carbonate/metallized transfer coating of present invention | 19.0 | 58.3 | 92.4 | 85.3 | 99.8 |

*Mead Kraft 18 pt. 69# paper board

What is claimed is:

1. A method for forming a high gloss coating on a porous substrate comprising the steps of
   (a) forming a high gloss coating composition by blending a waterborne, crosslinkable polymer that is resistant to water penetration when dried and cured with a water dispersible film forming polymer of at least 5,000 molecular weight in an aqueous medium;
   (b) applying said high gloss coating composition onto a smooth non-porous surface of a carrier substrate so as to provide a uniform, pin hole free coating at a rate equal to or greater than 0.3 lbs per 1000 square feet of carrier surface;
   (c) partially or fully curing said coating; and
   (d) transferring the cured high gloss coating from the carrier to the surface of a porous sheet material so as to provide a coated sheet material with a gloss rating equal to or greater than about 50.

2. A method according to claim 1 wherein said coating composition is applied to said smooth carrier substrate surface comprising one or more methods selected from the group consisting of Myar rod coating techniques, air knife coating techniques, slot coating techniques, doctor blade coating techniques, engraved roll coating techniques, and dip coating techniques.

3. A method of making a high gloss coated substrate according to claim 1 wherein said step of partially or fully curing the cast coating comprises a method selected from the group consisting of air drying, heating, exposure to x-rays, gamma rays, ultraviolet light, electron beams, microwaves, corona discharges, and high energy radiation.

4. A method of making a high gloss coated substrate according to claim 1 wherein said cured or partially cured coating is transferred from the carrier to the surface of said porous sheet material by a method selected from the group consisting of hot pressing and heated pressure rolling.

5. A method according to claim 1 wherein the method of transferring said cured high gloss cured coating from the carrier to the surface of a porous sheet material further comprises any of the steps of applying an adhesive layer or adhesive promoter to the surface of the coating, or to the surface of the porous substrate sheet material, or to both, before transferring said coating to said porous substrate.

6. A method according to claim 5 wherein the coating is transferred by hot pressing or heated roll pressure.

7. A method of making a coated sheet material according to claim 1 that further comprises the step of color coating the coated surface before transferring the coating from the carrier onto the surface of the porous sheet material.

8. The method according to claim 7, wherein the step of color coating comprises printing a design or indicia onto the coated surface.

9. The method according to claim 7, wherein the step of color coating comprises depositing a metal layer onto the coated surface.

10. A method according to claim 1 wherein the step of curing is performed simultaneously with the step of transferring.

11. A method according to claim 1 which additionally comprises any of the steps of adding fillers, dyes, pigments, colorants, metallized layers, printing and texture to any of the components of the sheet material.

12. A method of making a high gloss sheet material according to the method of claim 1 wherein said porous sheet material is a cellulose-based substrate material such as paper, paperboard, Kraft liner, corrugated paperboard, newsprint, non-corrugated Kraft paper stock, pan liner paper, pressed board, and the like.

13. A method of making a high gloss coated sheet material according to claim 1 which further comprises casting a release layer onto the exposed surface of the high gloss coating after the coating has been transferred to the porous sheet material and the carrier has been removed from the coating.

14. A method according to claim 1 which further comprises the steps of adding one or more additional polymer layers to any of the cast high gloss barrier coating layer on the carrier substrate before being transferred to the porous substrate, or the porous substrate sheet material before transferring the high gloss barrier layer, or the transferred high gloss coating surface after it has been transferred to the porous sheet substrate and the carrier has been removed.

15. A method for making a holographic image supporting coating on the surface of a porous substrate sheet material comprising the steps of (a) forming a coating composition by blending a waterborne, crosslinkable polymer that is resistant to water penetration when dried and cured with a water dispersible film forming polymer of at least about 5,000 molecular weight in an aqueous medium;

(b) applying said coating composition onto a carrier substrate wherein said carrier surface has inscribe etchings or embossed patterns capable of providing a holographic image, wherein said coating is applied so as to provide a uniform, pin hole free coating at a rate equal to or greater than 0.4 lbs per 1000 square feet of etched or embossed carrier surface;

(c) partially or fully curing said coating sufficiently to allow the coating to form a casting of the imprint on the carrier surface; and (d) transferring the cured coating, with the imprint of the carrier surface, from the carrier to at least one surface of a porous sheet material so as to produce a holographic image on the surface of said sheet material.

16. A method according to claim 15 wherein said holographic image supporting coating composition is applied to said etched or embossed carrier substrate surface comprising one or more methods selected from the group consisting of Myar rod coating techniques, air knife coating techniques, slot coating techniques, doctor blade coating techniques, engraved roll coating techniques, and dip coating techniques.

17. A method of making a holographic image coating on the surface of a porous substrate according to claim 15 wherein said step of partially or fully curing the cast coating comprises a method selected from the group consisting of air drying, heating, exposure to x-rays, gamma rays, ultraviolet light, electron beams, microwaves, corona discharges, and other forms of high energy radiation.

18. A method of making a holographic image coating on the surface of a porous substrate according to claim 15 wherein said cured or partially cured coating is transferred from the carrier to the surface of said porous sheet material by a method selected from the group consisting of hot pressing and heated pressure rolling.

19. A method of making a holographic image coating on the surface of a porous substrate according to claim 15 wherein the method of transferring said cured holographic image supporting cured coating from the carrier to the surface of a porous sheet material further comprises any of the steps of applying an adhesive layer or adhesive promoter to the surface of the coating, or to the surface of the porous substrate sheet material, or to both, before transferring said coating to said porous substrate.

20. A method according to claim 19 wherein the coating is transferred by hot pressing or heated roll pressure.

21. A method of making a coated sheet material according to claim 15 that further comprises the step of color coating the coated surface on top of the carrier before transferring the coating from the carrier onto the surface of the porous sheet material.

22. The method according to claim 21, wherein the step of color coating comprises printing a design or indicia onto the coated surface.

23. The method according to claim 21, wherein the step of color coating comprises depositing a metal layer onto the coated surface.

24. A method according to claim 15 wherein the step of curing is performed simultaneously with the step of transferring.

25. A method according to claim 15 which additionally comprises any of the steps of adding fillers, dyes, pigments, colorants, metallized layers, printing and texture to any of the components of the sheet material.

26. A method of making a sheet material according to the method of claim 15 wherein said porous sheet material is a cellulose-based substrate material such as paper, paperboard, Kraft liner, corrugated paperboard, newsprint, non-corrugated Kraft paper stock, pan liner paper, pressed board, and the like.

27. A method of making a holographic image supporting coated sheet material according to claim 15 which further comprises casting a release layer onto the exposed surface of the holographic image supporting coating after the coating has been transferred to the porous sheet material and the carrier has been removed from the coating.

28. A method according to claim 15 which further comprises the steps of adding one or more additional polymer layers to any of the cast holographic image supporting barrier coating layer on the carrier substrate before being transferred to the porous substrate, or the porous substrate sheet material before transferring the holographic image supporting barrier layer, or the transferred holographic image coating surface after it has been transferred to the porous sheet substrate and the carrier has been removed.

* * * * *